March 17, 1953  L. A. WELLS  2,631,625
FRUIT CUTTING AND JUICE EXTRACTING MACHINE
Filed Nov. 12, 1948  4 Sheets-Sheet 1
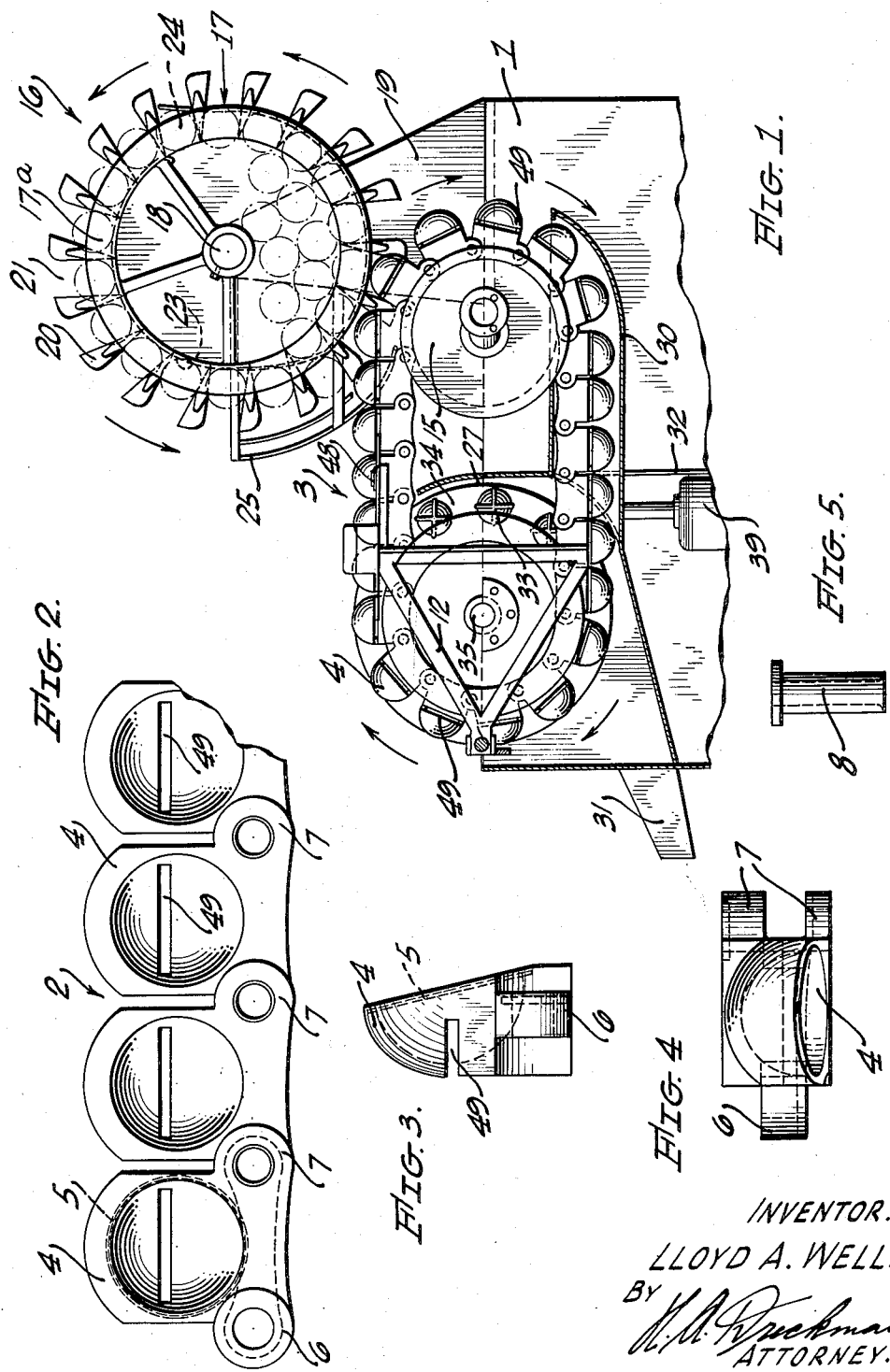
INVENTOR.
LLOYD A. WELLS,
BY
ATTORNEY.

March 17, 1953          L. A. WELLS          2,631,625

FRUIT CUTTING AND JUICE EXTRACTING MACHINE

Filed Nov. 12, 1948          4 Sheets-Sheet 2

INVENTOR.
LLOYD A. WELLS,
BY
ATTORNEY.

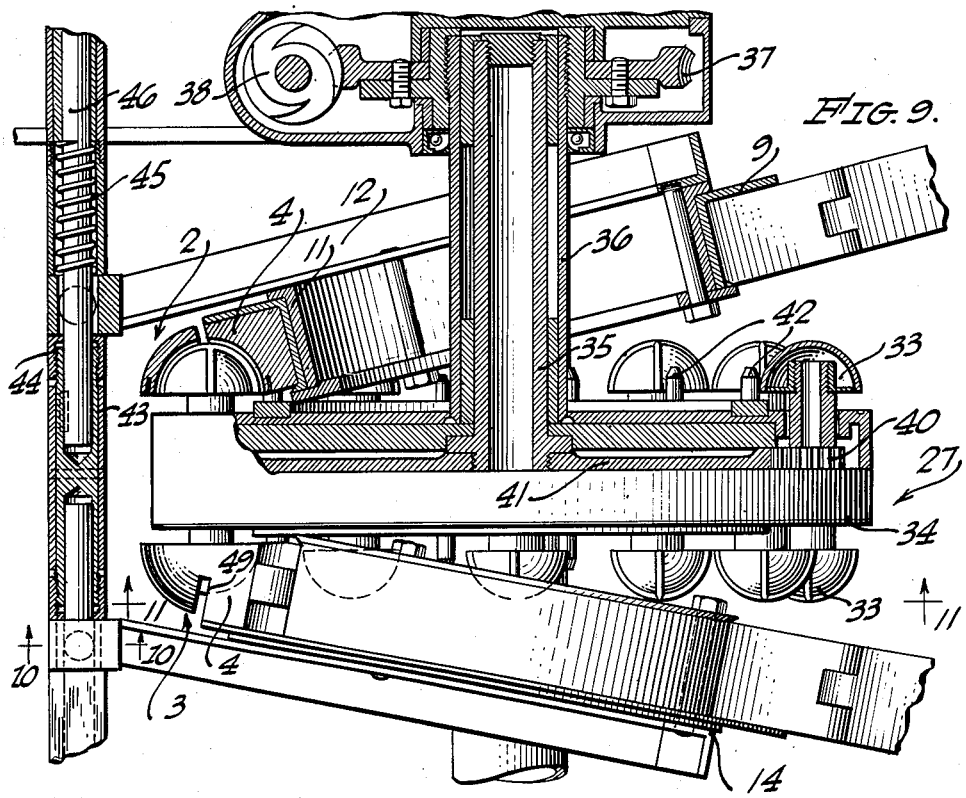
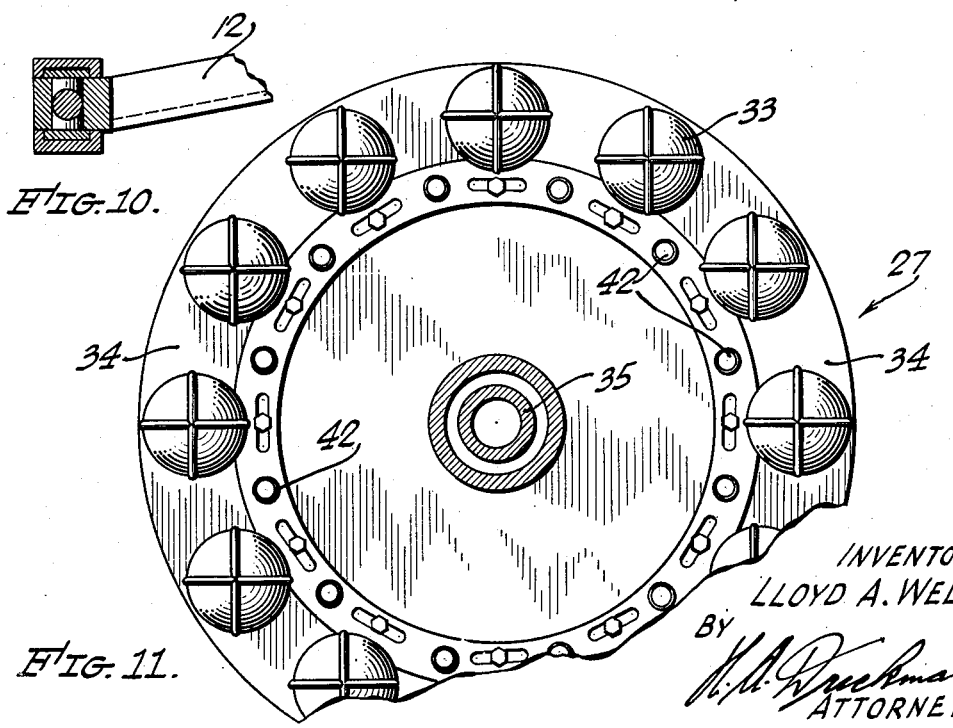

March 17, 1953 — L. A. WELLS — 2,631,625
FRUIT CUTTING AND JUICE EXTRACTING MACHINE
Filed Nov. 12, 1948 — 4 Sheets-Sheet 4
FIG. 12.
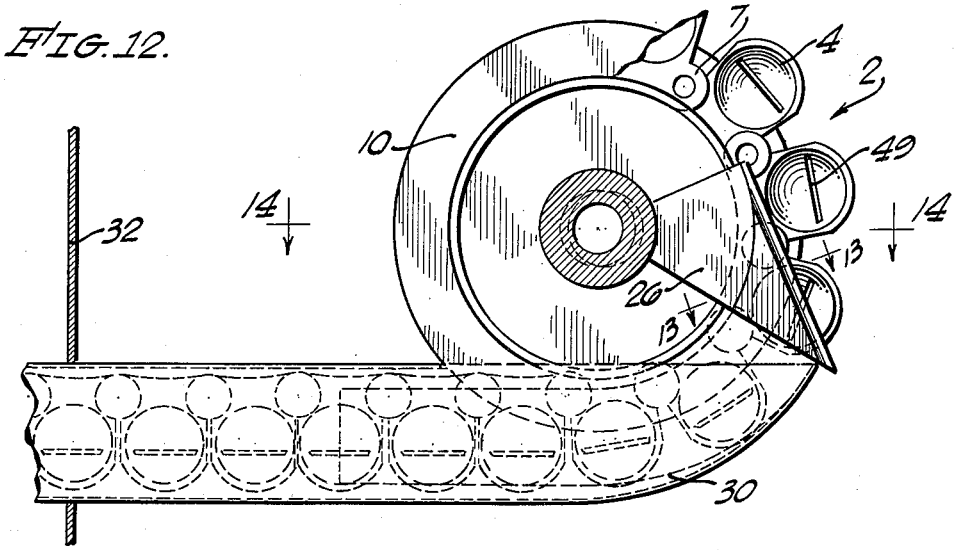
FIG. 13.
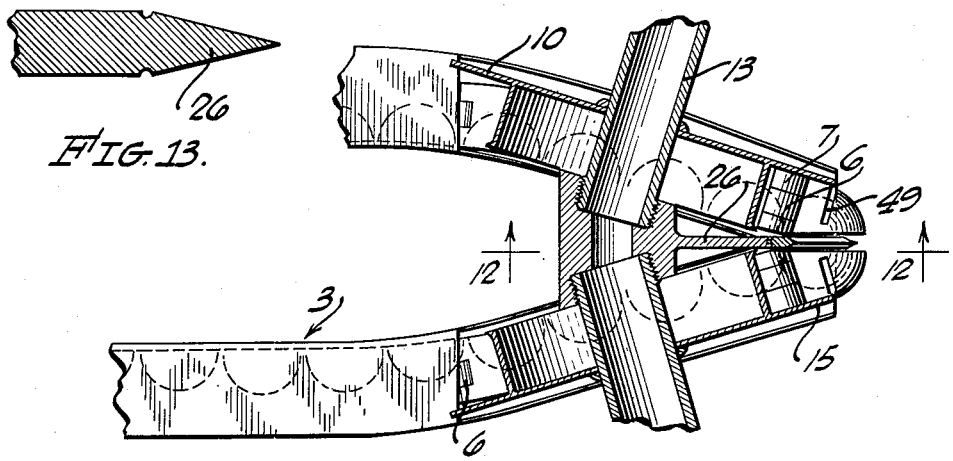
FIG. 14
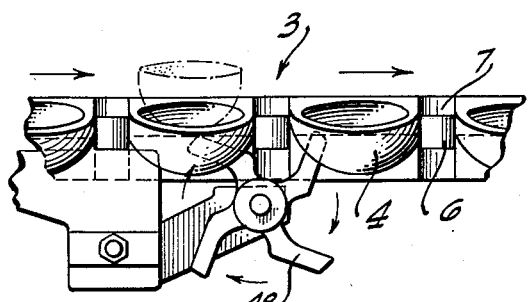
FIG. 15.
INVENTOR.
LLOYD A. WELLS,
BY
ATTORNEY.

Patented Mar. 17, 1953

2,631,625

UNITED STATES PATENT OFFICE 2,631,625

FRUIT CUTTING AND JUICE EXTRACTING MACHINE

Lloyd A. Wells, Long Beach, Calif., assignor to Brown Citrus Machinery Corporation, Whittier, Calif., a corporation of California Application November 12, 1948, Serial No. 59,477

17 Claims. (Cl. 146—3)

This invention relates to a fruit cutting and juice extracting machine, particularly for citrus fruits, such as oranges, lemons, grapefruit and the like.

An object of my invention is to provide a novel commercial machine which is used in large plants and where large quantities of fruit are passed through the machine daily.

Another object of my invention is to provide a novel machine of the character stated in which the fruit is fed into a pair of complementary belts, the belts converging and diverging during rotation thereof, to permit various operations on the fruit held in the belts.

Another object of my invention is to provide a novel machine of the character stated in which a fruit feeding wheel is provided, wherein the fruit is moved into position to be grasped by cups in a flexible belt, this feed wheel being rotated by movement of the fruit holding belts.

A feature of my invention is to provide a novel means of ejecting the rind of the fruit after the juice has been extracted, this ejector being actuated by movement of the belts which grasp the fruit sections.

Other objects, advantages and features of invention may appear from the accompanying drawing, the subjoined detailed description and the appended claims.

In the drawing:

Figure 1 is a fragmentary longitudinal sectional view of my machine taken on lines 1—1 of Figure 6.

Figure 2 is a fragmentary front elevation of one of the belts showing the cup construction.

Figure 3 is an end view of one of the cups forming the belt.

Figure 4 is a top plan view of the same.

Figure 5 is a side elevation of one of the hollow pins connecting the cups.

Figure 9 is a fragmentary horizontal sectional view of the rear or driving end of the machine.

Figure 10 is a sectional view taken on line 10—10 of Figure 9.

Figure 11 is a fragmentary view taken on line 11—11 of Figure 9.

Figure 12 is a fragmentary side view of the front end of the machine showing the cutting knife.

Figure 13 is an enlarged fragmentary sectional view of the knife.

Figure 14 is a sectional view taken on line 14—14 of Figure 12.

Figure 15 is a fragmentary plan view of one of the belts showing the star wheel ejector.

Figure 6:
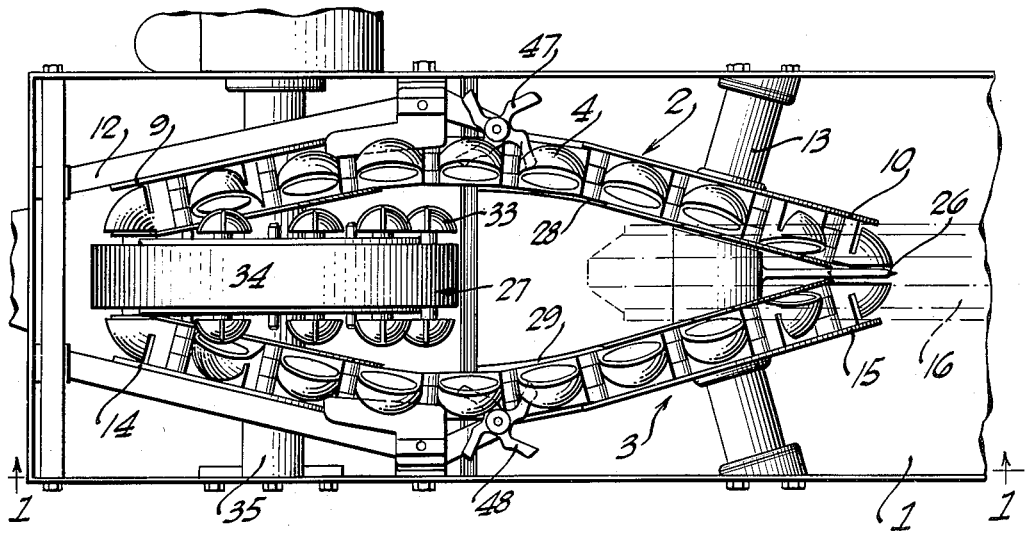
Figure 6 is a fragmentary bottom plan view of my machine.
Figure 7:
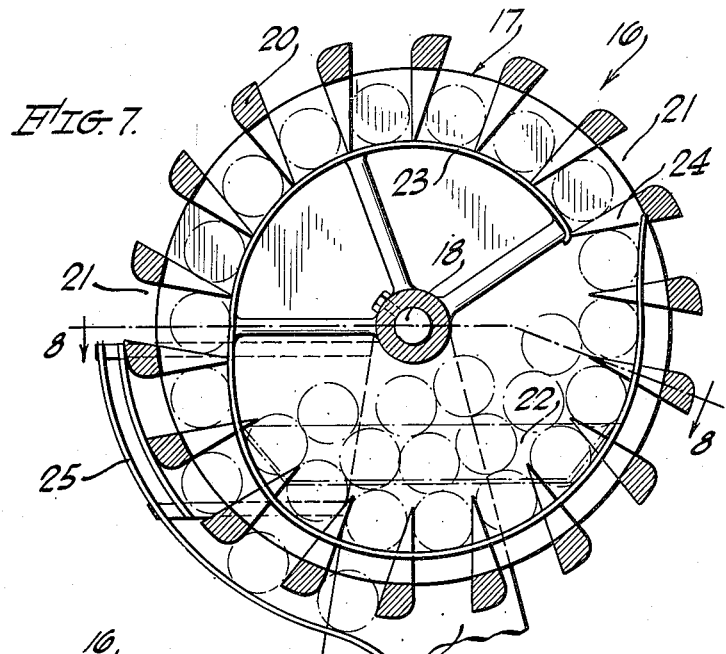
Figure 7 is a side elevation of the fruit feeder wheel.
Figure 8:
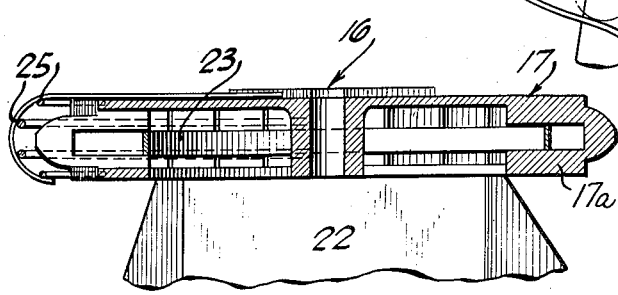
Figure 8 is a sectional view taken on line 8—8 of Figure 7.

Referring more particularly to the drawing, my fruit cutting and juice extracting machine comprises a frame 1 in which a pair of conveyor belts 2—3 are rotatably mounted. Each conveyor consists of a plurality of cups 4 which are pivotally connected together as will be subsequently described, and each cup forming in substance a link of the completed chain-like conveyor. Each cup on a conveyor is complementary to a similar cup on the adjacent conveyor and the two cups when brought together form a sphere for the purpose of holding or receiving spherical fruit, such as oranges, grapefruit, lemons, and the like. The cups 4 are preferably formed of rubber or plastic and each cup has a metal reinforcing 5 around the periphery of the opening therein and each cup is also provided with outwardly extending ears 6—7, the ears being drilled to receive a hollow pin 8, the purpose of which will be subsequently described.

The conveyor 2 moves over a pair of pulleys 9—10, the pulley 9 being formed as a ring and is journaled on a race 11, which is attached to a frame arm 12 of the machine. The pulley 10 is journaled on a shaft 13, which is fixedly mounted in the frame 1 of the machine. It is to be noted that the pulleys 9—10 are at an angle to each other, thus causing the conveyor 2 to move towards the conveyor 3 at both ends of the machine, as is best shown in Figure 6. In the center portion of the machine the conveyors 2—3 are a suitable distance apart and the purpose of this construction will be subsequently described.

The conveyor 3 moves over a pair of pulleys 14—15, which are similar in construction and arrangement to the pulleys 9—10 respectively. Pulleys 14—15 are also angularly positioned as are the pulleys 9—10, and these pulleys are so arranged that the conveyors 2—3 are moved adjacent each other at the front and rear ends of the machine and are separated at the center of the machine, as previously stated. The pulleys 9—10, 14—15 are all freely rotatable on their respective journals and the conveyors 2—3 are continuously rotated by the juice head, as will be subsequently described. The fruit is fed into the front end of the machine by a feeder wheel 16, which consists of a ring or plate 17 journaled on a shaft 18. The shaft 18 is mounted on the frame 1 of the machine and preferably on a bracket 19. The ring 17 is formed with a plurality of substantial radial webs or blades 20, which are spaced to provide fruit receiving pockets or receptacles 21. The fruit receiving receptacles 21 are open on both the inside and the outside of the ring 17 and the fruit is first fed into the inside of the ring 17 by means of a chute or hopper 22. A stationary baffle or rail 23 formed of a narrow strip of metal extends along the inner side of the openings 21 at the top side of the wheel 16 and at the lower end of the wheel. This rail or guide is positioned adjacent the outer end of the openings 21 and is generally helical or spiral in shape, extending at one end from the periphery of the upper portion of the plate to the other end which is spaced inwardly from the periphery of the plate. This leaves a space 24 through which the fruit passes. Secured to the webs 20 and parallel to the plate 17 is an annular cover member 17a which defines, with the upper portion of the rail 23 and plate 17, a substantially U-shaped channel for the reception of the fruit. As the wheel 16 rotates the fruit is supported on the rail 23 at the top and also by the rail at the bottom. The webs 20 extend outwardly from the periphery of the wheel 16 and are contacted by the individual cups 4 to cause the wheel to be rotated in synchronism with the movement of the conveyors and in the direction of the arrows in Figure 1. As this wheel then moves in the direction shown by the arrows in Figure 1 the fruit will tend to drop outwardly but is restrained from falling out of the wheel by the arcuate fingers 25 which are preferably formed of wire. These fingers hold the fruit within the receptacles 21 until the fruit moves to a position where a pair of cups 4 on the conveyors 2—3 will move inwardly, thus backing up the fruit between two cups and then continued movement of the conveyors 2—3 will move the fruit across the fixed slicing knife 26, which is positioned between the cups 4 on the conveyors 2—3, as shown in Figures 6 and 14, and the fruit will be cut in halves, leaving a half of the fruit in each of the complementary cup sections, until the fruit is conveyed to the juicing head 27. While the fruit is being carried along the bottom reaches of the conveyors 2—3, the fruit is held in each of the cups 4 by fixed guides or baffle plates 28—29. The juice trough 30 extends under the lower reaches of the conveyors 2—3 and terminates in a discharge spout 31 in the rear of the machine. A vertical wall 32 separates the front and rear of the machine so that the discharged rind of the fruit will fall out through the bottom of the machine and will not drop forwardly into the juice outlet spout 31.

The juicing head 27 consists of a plurality of circumferentially spaced reamers 33. These reamers being positioned on both sides of a cylindrical head 34. The head 34 is power driven in the following manner: a shaft 35 is fixedly mounted in the frame 1 of the machine. The head 34 is journaled on this shaft by means of a sleeve 36. A gear 37 is fixedly attached to the sleeve 36 and a driving gear 38 meshes with the gear 37 and the driving gear 38 in turn is rotated by the motor 39. Thus, the head 34 is continuously rotated and the reamers 33 are rotated in geared relation to the head 34 by the following arrangement: Each reamer has a gear 40 secured thereto and all of the gears 40 engage a ring gear 41, which gear is fixedly mounted on the stationary shaft 35. A plurality of spaced pins 42 project from both phases of the head 34 and these pins enter the hollow connecting pins 8, thus driving both of the conveyors 2—3 synchronously with the head 34. The reamers 33 are so spaced that a reamer will enter each of the cups 4 as the cups move toward each other due to the angular position of the pulleys 9 and 14. Figure 9 illustrates the fact that the reamers 33 will gradually enter the cups 4 and will gradually move into the pulpy mass of the fruit, thus squeezing the juice from the fruit as well as reaming some of the pulp from the fruit. The frames 12 of the conveyors 2—3 can be adjusted horizontally to determine the distance which the reamers will enter a cup 4. This horizontal adjustment of the frame 12 is accomplished by threading a sleeve nut 43 into an internally threaded nut 44 which bears against the side of the frame 12 and moves this frame against a spring 45. The sleeve 43 is rotated by a shaft 46 which is manually rotated when adjustment is necessary. The juice and other material obtained from the fruit drops downwardly into the trough 30 and pours out through the spout 31.

After the juice and certain portions of the pulp have been removed by the operation of the juicer head 27, the conveyors 2—3 continue to rotate and the cups 4 will carry the rind of the fruit until the star wheels 47—48 are reached. Each of the star wheels are freely rotatable on the frame of the machine and the arms of the star wheels enter slots 49 in the cups, thus causing an arm of the star wheel to press against the rind, pushing the same inwardly and ejects it from the cup. The rind falls back of the baffles or wall 32 and drops downwardly through the machine into a suitable receptacle (not shown). It is to be noted that the star wheels 47—48 are caused to rotate by the movement of the conveyors 2—3, the arms of the star wheels being so spaced so that one arm is always within a slot 49 of one of the cups 4.

In operation fruit is fed through the chute 22, into the feed wheel 16. The motor 39 is now started, causing the juicer head 27 to rotate through the gears 37—38. Rotation of the juicer head will cause rotation of the reamers 33, as previously described. Also, the pins 42 will engage the various hollow pins 8, thus simultaneously driving the conduits 2—3 and also causing these conduits to move synchronously so that the complementary cups 4 in the two conveyors will always match to form a complete hollow spherical cup. Movement of the cups 4 in the conveyors 2—3 will compress against properly positioned fruit in the bottom of the feed wheel 16, thus causing the cups to grip the fruit and also causing the wheel 16 to be rotated synchronously with the conveyors 2—3. The fruit held in the cups 4 is now carried past the knife 26 which cuts the fruit into two. The fruit halves are now held in the cups by the baffles 28—29 until the juicer head 27 is reached and at this time the two conveyors converge causing the reamers 33 to enter the cups with the fruit halves therein, thereby squeezing out the juice and removing some of the eatable pulp. The juice drops downwardly into the trough 30 and then pours out through the discharge spout 31. The non-eatable rind is retained in the cups and the star wheels 47—48 eject this rind and thereafter the cups are empty and the operation previously described is repeated.

Having described my invention, I claim:

1. A fruit cutting and juice extracting machine comprising a pair of complementary conveyors, each conveyor consisting of an elliptical shaped unit, each of said conveyors being deformable laterally, a plurality of cups in each conveyor, a pin extending through adjacent cups to form a link conveyor, said cups in the two conveyors being arranged in complementary pairs to grip the fruit, guide means over which said conveyors move, said conveyors being positioned in a substantially vertical plane, said conveyors being moved toward each other at one point in their rotation and away from each other at another point in their rotation, means to drive said conveyors, feed means for positioning the fruit to be gripped by said cups, a cutter knife positioned between the complementary cups and at a point where the conveyors converge, a juicing head at one end of the conveyors, means to rotate said head, a plurality of circumferentially spaced reamers on said head, means to rotate each of the reamers and each of said reamers entering a cup to extract juice from the fruit in the cup, said conveyors converging at the feed means whereby said complementary cups engage the fruit therebetween and said conveyors converging at the juicing head whereby said reamers are caused to enter the cups.

2. A fruit cutting and juice extracting machine comprising a pair of complementary conveyors, each of said conveyors being deformable laterally, a plurality of cups in each conveyor, a pin extending through adjacent cups to form a link conveyor, said cups in the two conveyors being arranged in complementary pairs to grip the fruit, guide means over which said conveyors move, said conveyors being positioned in a substantially vertical plane, said conveyors being moved toward each other at one point in their rotation and away from each other at another point in their rotation, means to drive said conveyors, feed means for positioning the fruit to be gripped by said cups, a cutter knife positioned between the complementary cups and at a point where the conveyors converge, a juicing head at one end of the conveyors, means to rotate said head, a plurality of circumferentially spaced reamers on said head, means to rotate each of the reamers and each of said reamers entering a cup to extract juice from the fruit in the cup, an ejector means entering each of the cups to remove the fruit therefrom, said ejector means being positioned at a point of divergence of the conveyors, said conveyors converging at the feed means whereby said complementary cups engage the fruit therebetween and said conveyors converging at the juicing head whereby said reamers are caused to enter the cups.

3. In a fruit cutting and juice extracting machine, the combination of a pair of complementary conveyors, each conveyor being an elliptical shaped unit, each of said conveyors being deformable laterally, a plurality of cups forming links in each conveyor, a pin extending through adjacent cups to form a link conveyor, the cups in the two conveyors being arranged in complementary pairs to grip the fruit, a pair of spaced pulleys over which each of said conveyors move, said pulleys being journalled with the axes of each pair thereof intersecting at an angle, the pulley at one end of one conveyor being substantially parallel to the pulley at the opposite end of the other conveyor, whereby said conveyors converge at both ends of the machine and diverge at the center of the machine, a cutter knife positioned at one end of said conveyor to bisect the fruit, a juicing head journalled between one pair of adjacent pulleys at the other end of said conveyor, reamers on both sides of the juicing head, said reamers entering the cups in both conveyors, means to rotate said juicing head, and means on the juicing head engaging both of said conveyors during a part of the rotation of said juicing head whereby the conveyors are rotated by said juicing head.

4. In a fruit juice extracting machine, the combination of a pair of complementary conveyors, each conveyor being deformable laterally, a plurality of spaced cups in each conveyor, each of said cups being provided with a slot, said cups in the two conveyors being arranged in complementary pairs to grip the fruit, cutter means for bisecting the fruit as it is gripped between complementary cups, guide means over which said conveyors move, said conveyors being moved adjacent each other at one point in their rotation and away from each other at another point in their rotation, means to drive said conveyors, a juicing head at one end of said conveyors, means to rotate said head, a plurality of circumferentially spaced reamers on said head, means to rotate said reamers, each of said reamers entering a cup to extract juice from the fruit in the cup, and ejector means at the divergent point in the rotation of the conveyors, said ejector means comprising a pair of stationary members each adapted to enter the cups of one of said conveyors through the slots to remove the fruit peel therefrom.

5. In a fruit juice extracting machine, the combination of a pair of conveyors, a plurality of cups on each conveyor, said cups being arranged in complementary pairs to grip the fruit, a cutter knife positioned at one end of said conveyor to bisect the fruit, a single juicing head at the other end of said pair of conveyors, means for rotating said head, a plurality of circumferentially spaced reamers on both sides of said head, means to rotate said reamers, each of said reamers being positioned to enter a cup to extract juice from a fruit half held therein, and drive means on the head directly engaging both conveyors to rotate the same.

6. In a fruit juice extracting machine, the combination of a pair of laterally deformable endless conveyors, said conveyors converging toward each other at the ends thereof and diverging away from each other in the central portion thereof, a cutter knife positioned between the conveyors at one end thereof, a plurality of cups on each conveyor, said cups being arranged in complementary pairs to grip a whole fruit therebetween at a point adjacent the cutter knife, a juicing head at the other end of said conveyors, means for rotating said head, a plurality of circumferentially spaced reamers on said head, means to rotate said reamers, each of said reamers being positioned to enter a cup to extract juice from a fruit half held therein, and drive means on the head engaging both conveyors to rotate the same.

7. In a fruit juice extracting machine, the combination of a pair of complementary endless conveyors, each conveyor consisting of an elliptical shaped unit, a plurality of cups in each conveyor, said cups in the two conveyors being arranged in complementary pairs to grip the whole fruit, guide means over which said conveyors move, said conveyors being moved toward each other at one point in their rotation and away from each other at another point in their rotation, a cutter knife positioned between the conveyors at the converging end thereof, a single juicing head at one end of said conveyors, means to rotate said head, a plurality of circumferentially spaced reamers on both sides of said head, means to rotate said reamers, each of said reamers entering a cup to extract juice from the fruit in the cup, and drive means on the head directly engaging both conveyors to rotate the same.

8. In a fruit juice extracting machine, the combination of a pair of laterally deformable endless conveyors, said conveyors converging toward each other at the ends thereof and diverging away from each other in the central portion thereof, a cutter knife positioned between the conveyors at one end thereof, a plurality of cups on each conveyor, said cups being arranged in complementary pairs to grip a whole fruit therebetween at a point adjacent the cutter knife, a juicing head at the other end of said conveyors, means for rotating said head, a plurality of circumferentially spaced reamers on said head, means to rotate said reamers, each of said reamers being positioned to enter a cup to extract juice from a fruit half held therein, and feed means for positioning the fruit to be gripped by the cups, said feed means being positioned between the two ends of the conveyor and adjacent the first said converging end of said conveyors whereby said complementary cups engage the whole fruit therebetween as the cups move past the feed means.

9. In a fruit juice extracting machine, the combination of a pair of complementary conveyors, a plurality of cups in each conveyor, said cups in the two conveyors being arranged in complementary pairs to grip the fruit, guide means over which said conveyors move, said conveyors being moved toward each other at one point in their rotation and away from each other at another point in their rotation, means to drive said conveyors, feed means for the fruit, said feed means positioning the fruit to be gripped by said cups, a cutter knife adjacent said feed means for bisecting fruit gripped by said cups, a juicing head at one end of said conveyors, means to rotate said head, a plurality of circumferentially spaced reamers on said head, means to rotate said reamers, each of said reamers entering a cup to extract juice from the fruit in the cup, said conveyors converging at the feed means whereby said complementary cups engage the fruit therebetween and said conveyors converging at the juicing head whereby said reamers are caused to enter the cups.

10. In a fruit juice extracting machine, the combination of a pair of laterally deformable endless conveyors, said conveyors converging toward each other at the ends thereof and diverging away from each other in the central portion thereof, a cutter knife positioned between the conveyors at one end thereof, a plurality of cups on each conveyor, said cups being arranged in complementary pairs to grip a whole fruit therebetween at a point adjacent the cutter knife, a juicing head at the other end of said conveyors, means for rotating said head, a plurality of circumferentially spaced reamers on said head, means to rotate said reamers, feed means for the fruit, said feed means positioning the fruit to be gripped by the cups, said conveyors converging at the feed means whereby said complementary cups engage the fruit therebetween and said conveyors converging at the juicing head whereby said reamers are caused to enter the cups.

11. In a juice extracting machine, the combination of a pair of endless conveyors, each conveyor being deformable laterally, guide means over which said conveyors move, a plurality of cups on each of said conveyors, the cups on the two conveyors being arranged in complementary pairs to grip the fruit, a pair of pulleys over which each of the conveyors move, said pulleys being mounted with the axes of each pair thereof intersecting at an obtuse angle and converging toward the end of the conveyor, the pulley at one end of one conveyor being substantially parallel to the pulley at the opposite end of the other conveyor, whereby said conveyors converge at both ends of the machine and diverge in the center of the machine.

12. In a fruit cutting and juice extracting machine, the combination of a pair of complementary conveyors, each of said conveyors being deformable laterally, a plurality of cups in each conveyor, the cups in the two conveyors being arranged in complementary pairs to grip the whole fruit, a pair of spaced pulleys over which each of said conveyors move, said pulleys being journalled with the axes of each pair thereof intersecting at an angle, the pulley at one end of one conveyor being substantially parallel to the pulley at the opposite end of the other conveyor, whereby said conveyors converge at both ends of the machine and diverge at the center of the machine, a cutting knife positioned between the conveyors at one converging end thereof, a juicing head journalled between one pair of adjacent pulleys, reamers on both sides of the juicing head, said reamers entering the cups in both conveyors, and means to rotate said juicing head.

13. In a fruit juice extracting machine, the combination of a pair of complementary endless conveyors confronting each other and having paths of travel in different upright planes, each of said conveyors being deformable laterally, a plurality of spaced cups in each conveyor, each cup having ear means at opposite sides thereof to receive a pin, a pin extending through the ear means of adjacent cups to form a link conveyor, said cups in the two conveyors being arranged in complementary confronting pairs to grip the fruit, guide means over which said conveyors move, said conveyors being moved by said guide means toward each other at one point in their path of rotation and away from each other at another point in their path of rotation, means to drive said conveyors, and feed means for the fruit, said feed means positioning the fruit to be gripped by said cups, said conveyors converging at the feed means thereby moving the cups of each pair inwardly toward each other to grip the fruit between complementary cups as the conveyors move past said feed means.

14. In a fruit juice extracting machine, the combination of a pair of endless conveyors confronting each other and having paths of travel in different upright planes, a plurality of spaced cups in each conveyor, said cups being arranged on said conveyors in confronting complementary pairs to grip the fruit, means for moving said conveyors toward each other at one point in their travel and away from each other at another point in their travel, means to drive said conveyors, and feed means for the fruit, said feed means positioning the fruit to be gripped by said cups, said conveyors converging at the feed means to thereby move the complementary pairs of cups toward each other bodily in a direction transverse to the path of travel of said conveyors to grip the fruit between complementary cups as the conveyors move past said feed means.

15. In a fruit juice extracting machine, the combination of a pair of laterally deformable endless conveyors, said conveyors converging toward each other at the ends thereof and diverging away from each other in the central portion thereof, a cutter knife positioned between the conveyors at one end thereof, a plurality of cups on each conveyor, said cups being arranged in complementary pairs to grip a whole fruit therebetween at a point adjacent the cutter knife, a juicing head at the other end of said conveyors, means for rotating said head, a plurality of circumferentially spaced reamers on said head, means to rotate said reamers, each of said reamers being positioned to enter a cup to extract juice from a fruit half held therein, drive means on the head engaging both conveyors to rotate the same, and feed means for positioning the fruit to be gripped by the cups, said feed means being positioned between the two ends of the conveyor and adjacent the first said converging end of said conveyors whereby said complementary cups engage the whole fruit therebetween as the cups move past the feed means.

16. In a fruit juice extracting machine, the combination of a pair of laterally deformable endless conveyors, said conveyors converging toward each other at the ends thereof and diverging away from each other in the central portion thereof, a cutter knife positioned between the conveyors at one end thereof, a plurality of cups on each conveyor, said cups being arranged in complementary pairs to grip a whole fruit therebetween at a point adjacent the cutter knife, a juicing head at the other end of said conveyors, means for rotating said head, a plurality of circumferentially spaced reamers on said head, means to rotate said reamers, drive means on the head engaging both conveyors to rotate the same, feed means for the fruit, said feed means positioning the fruit to be gripped by the cups, said conveyors converging at the feed means whereby said complementary cups engage the fruit therebetween and said conveyors converging at the juicing head whereby said reamers are caused to enter the cups.

17. In a fruit cutting and juice extracting machine, the combination of a pair of complementary conveyors, each of said conveyors being deformable laterally, a plurality of cups in each conveyor, the cups in the two conveyors being arranged in complementary pairs to grip the whole fruit, a pair of spaced pulleys over which each of said conveyors move, said pulleys being journalled with the axes of each pair thereof intersecting at an angle, the pulley at one end of one conveyor being substantially parallel to the pulley at the opposite end of the other conveyor, whereby said conveyors converge at both ends of the machine and diverge at the center of the machine, a cutting knife positioned between the conveyors at one converging end thereof, a juicing head journalled between one pair of adjacent pulleys, reamers on both sides of the juicing head, said reamers entering the cups in both conveyors, means to rotate said juicing head, and drive means on the head engaging both conveyors to drive the same.

LLOYD A. WELLS.

REFERENCES CITED

The following references are of record in the file of this patent:

UNITED STATES PATENTS

| Number | Name | Date |
|---|---|---|
| 699,133 | Allis | May 6, 1902 |
| 1,020,900 | Hadley | Mar. 19, 1912 |
| 1,901,042 | Robins | Mar. 14, 1933 |
| 2,065,271 | Faulds | Dec. 22, 1936 |
| 2,078,737 | Segovia | Apr. 27, 1937 |
| 2,199,876 | Brown | May 7, 1940 |
| 2,264,361 | Chapman | Dec. 2, 1941 |
| 2,283,615 | Skinner et al. | May 19, 1942 |
| 2,354,721 | Walker et al. | Aug. 1, 1944 |
| 2,428,157 | Healy | Sept. 30, 1947 |
| 2,499,266 | Carroll | Feb. 28, 1950 |